United States Patent [19]

Bechara et al.

[11] Patent Number: 5,985,955

[45] Date of Patent: *Nov. 16, 1999

[54] HYPOALLERGENIC COATING COMPOSITION FOR LATEX RUBBER GLOVES

[75] Inventors: Ibrahim Bechara, Naperville, Ill.; Frank Bonney, Gary, Ind.; Konstantinos Arvanitis, Bloomingdale, Ill.

[73] Assignee: Witco Corporation, Greenwich, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/850,326

[22] Filed: May 2, 1997

Related U.S. Application Data

[63] Continuation of application No. 08/278,430, Jul. 21, 1994, abandoned.
[51] Int. Cl.$^6$ .............................. C08K 3/20; C08L 63/02
[52] U.S. Cl. ...................... 523/415; 2/161.7; 428/424.8; 523/412; 524/591; 524/839
[58] Field of Search ..................................... 524/540, 542, 524/591, 839; 523/412; 428/415, 424.8; 2/159, 161.7

[56] References Cited

U.S. PATENT DOCUMENTS

| | | |
|---|---|---|
| 3,813,695 | 6/1974 | Podell . |
| 4,575,476 | 3/1986 | Podell . |
| 4,642,267 | 2/1987 | Creasy et al. ........................... 524/507 |
| 4,644,030 | 2/1987 | Loewrigkeit . |
| 5,088,125 | 2/1992 | Ansell . |
| 5,177,141 | 1/1993 | Thoma et al. .......................... 524/591 |
| 5,272,771 | 12/1993 | Ansell et al. ............................... 2/167 |

OTHER PUBLICATIONS

Blank and Hensley, J. of Paint technology 1974, pp. 46–47.

*Primary Examiner*—Robert Dawson
*Assistant Examiner*—D. Aylward
*Attorney, Agent, or Firm*—Edward K. Welch, II; Andrew S. Reiskind; Timothy X. Witkowski

[57] ABSTRACT

Disclosed are aqueous dispersions of polyurethane polymers from which films can be formed which have enhanced hydrophilicity. The enhanced hydrophilicity is provided by hydrophilic moieties chemically incorporated in the polymer network.

20 Claims, No Drawings

HYPOALLERGENIC COATING COMPOSITION FOR LATEX RUBBER GLOVES

This application is a continuation of application Ser. No. 08/278,430 filed Jul. 21, 1994, now abandoned.

FIELD OF THE INVENTION

The present invention relates to aqueous polymeric compositions and especially to aqueous polyurethane dispersions effective for producing water-resistant and organic solvent-resistant products, especially films and coatings on any suitable substrate. The invention furthermore relates to methods for making such dispersions and methods for using them, as well as to the films and coatings which can be produced from such dispersions.

The present invention relates more particularly to aqueous polyurethane-based dispersions wherein the polymeric component contains substituents which impart hydrophilicity to films and coatings that can be formed from dispersions of such polymeric products. A particularly advantageous embodiment to which this invention relates is the provision of films and coatings required to exhibit low-friction slip; one example of such a feature is the provision of coatings of the interior of surgical gloves.

BACKGROUND OF THE INVENTION

Polyurethanes have found widespread use in coatings for fabric, plastics, wood, metal and the like, because of their advantageous properties such as good chemical resistance, abrasion resistance, toughness, elasticity and durability, and their ability to cure rapidly. Such coatings are naturally applied as solutions in polar or aromatic hydrocarbon solvents, or are applied from aqueous dispersions. The employment of aqueous dispersions is gaining increasing favor in order to avoid the economic loss and the potential environmental hazards associated with the escape of solvent vapors into the atmosphere which cannot readily or economically be recaptured.

The films and coatings that are formed on substrate surfaces from solutions in organic solvents or from dispersions in aqueous vehicles tend frequently to be highly hydrophobic, even when the polyurethane polymer is configured to impart a relative degree of flexibility or resiliency to the coating. This hydrophobicity, of course, is often a very desirable property. However, there are applications in which it would be desirable that the film exhibit many of the properties for which polyurethanes are renowned, including the aforementioned resistance to chemical attack, abrasion resistance, toughness, durability and rapid cure, but in which the film or coating exhibits hydrophilicity, that is, an affinity for water or other polar and/or hydrophilic substances disposed on the cured polyurethane-based polymeric surface. Such hydrophilicity would be desired, for instance, in applications wherein the cured polyurethane polymer-based surface will be in contact (e.g. static, rolling, or sliding contact) with another surface and wherein even a minor amount of water or of another polar liquid may be present along the interface between the polyurethane polymer-based surface and the other surface. In this way, any tendency of the two surfaces to adhere to each other, where such adhesion is not desirable, could thereby be lessened or completely avoided.

One example, among many, wherein it is desirable to increase the hydrophilicity of the polyurethane polymer-based surface is in the field of rubber gloves, which are familiar adjuncts in the home, in the workplace, and in the medical professions. Gloves which are designed to fit relatively closely to the fingers, thumb and hand are relatively difficult to put on because of frictional engagement between the interior surface of the glove and the skin. This difficulty is increased when the glove is made from elastomeric material, such as natural rubber latex or other synthetic polymeric (i.e., homopolymeric or copolymeric) elastomers. This difficulty is compounded further when the hands or the interior surfaces of the glove are damp or wet. It has been conventional practice to attempt to alleviate these difficulties by employing dry particulate lubricating agents such as talc or starch which are applied to the interior surface of the glove, or to the hand, or both before the glove is donned. These agents add to the expense of the product, and they pose a risk of particles falling from the glove onto adjacent areas with consequences ranging from the catastrophic, when the glove is being worn by a surgeon in the operating theater, to the inconvenient, when the wearer is working at home or the workplace. In addition, such particulate lubricating agents do not form an effective barrier between the skin and the interior surface of the glove, whereas a barrier is highly desirable in order to protect the wearer against the risk of contacting allergenic agents known to be present in many elastomeric materials including natural rubber latex.

The present inventors have determined that the advantages of hydrophilicity can be imparted to a polyurethane polymer-based product and to films cast therefrom by certain techniques by which hydrophilicity-imparting agents are chemically incorporated into the polyurethane polymer.

DISCUSSION OF THE PRIOR ART

U.S. Pat. No. 5,088,125 discloses gloves fabricated from an allergenic elastomer and provided on the inner surface thereof with an ionic polyurethane. The ionic moiety is preferably incorporated into the polyurethane polymer by reacting the appropriate prepolymer with a chain extender containing ionic species. The ionic polyurethane may include a second polymer which can be another ionic polyurethane or can be derived from acrylic or methacrylic acid or esters thereof whose hardness can be altered by incorporation into the acrylic/acrylate polymer of a comonomer such as hydroxyethyl methacrylate, methyl methacrylate or acrylic acid. Ionic polyurethanes employed in such applications may have the drawbacks of poor adhesion to substrate surfaces such as the interior surfaces of rubber gloves, and the inability to impart a sufficiently low coefficient of friction between the film formed and the second surface. In addition, the presence of the ionized species presents a risk of unwanted reaction with other ionic compounds with which the ionic polyurethane may come into contact during use.

U.S. Pat. No. 4,575,476 and U.S. Pat. No. 3,813,695 disclose rubber and latex gloves whose inner surfaces are laminated with hydrophilic hydrogel polymeric material. The hydrogel polymers disclosed as suitable do not include polyurethanes, but are limited to copolymers of 2-hydroxyethyl methacrylate with either or both of methacrylic acid and 2-ethylhexyl acrylate.

Another polyurethane-based polymer system useful for forming films and coatings from aqueous dispersions is disclosed in U.S. Pat. No. 4,644,030. That patent discloses forming a dispersion in water of an isocyanate-terminated polyurethane prepolymer in admixture with inert liquid polymerizable ethylenically unsaturated monomer material, chain extending the prepolymer to fully react it, and then subjecting the ethylenically unsaturated monomer material to vinyl addition polymerization in situ to form an interpolymeric product containing polyurethane and a second polymer. The technology disclosed in this patent, while highly useful, does not particularly suggest how the hydrophilicity of the polymer product that is formed may be increased.

Thus, there remains a need unmet in the prior art for polyurethane-based polymer dispersions and films formed therefrom wherein the polymeric component exhibits increased hydrophilicity.

SUMMARY OF THE INVENTION

Stated generally, one aspect of the present invention is the incorporation of one or more nonionic, hydrophilicity-imparting agents directly into the polymeric network of the polyurethane polymer or of an interpolymerized network of polyurethane and a second polymer.

One aspect of the present invention is a process for forming a stable aqueous dispersion of polymeric material, comprising reacting together one or more isocyanato compounds having two or more pendant isocyanate groups, one or more polyol compounds having two or more pendant hydroxyl groups, and one or more agents effective to impart hydrophilicity to said polymeric material and containing one or more hydroxyl groups reactive with said isocyanate groups, under conditions effective to form a water-dispersible prepolymer containing unreacted isocyanate groups; and then chain extending that reaction product under conditions effective to fully react said product and form a dispersion thereof in water. In this embodiment the moiety imparting hydrophilicity to the films and coatings formed from the dispersion is chemically incorporated directly into the polyurethane prepolymer which is subsequently chain extended.

Another embodiment of the present invention is a process for forming a stable aqueous dispersion of polymeric material comprising reacting an isocyanate-terminated polyurethane prepolymer with one or more agents effective to impart hydrophilicity to said polymeric material and containing two or more groups reactive with said isocyanate groups; and then chain extending the reaction product as necessary to fully react the isocyanate groups, wherein the chain-extending reaction, or both the chain-extending step and the reaction forming the prepolymer, are carried out in aqueous dispersion. In this embodiment the agent imparting hydrophilicity is employed as a chain-extending agent linking together prepolymer units, and is thereby chemically incorporated into the polyurethane polymer.

Yet another embodiment of the present invention forms a stable aqueous dispersion of polymeric material by providing a dispersion in water of an isocyanate-terminated polyurethane prepolymer in admixture with inert liquid polymerizable ethylenically unsaturated monomer material and chain extending the prepolymer to fully react the isocyanate groups, and then adding to the dispersion one or more ethylenically unsaturated agents effective to impart hydrophilicity to the polymeric material, whereupon the ethylenically unsaturated agent and the ethylenically unsaturated monomer material are copolymerized together. In this way, the hydrophilicity-imparting agent is again chemically incorporated directly into the interpolymerized network.

Additional aspects of the present invention include aqueous dispersions of polyurethane-based polymeric systems prepared in accordance with any of the foregoing processes, as well as compositions comprising any of such dispersions in a vehicle suitable for applying the composition to a substrate surface.

DETAILED DESCRIPTION OF THE INVENTION

Polyurethane-based polymer systems useful in the present invention capable of being cast into films exhibiting increased hydrophilicity can be formed in accordance with the present invention in any of a variety of ways. In one embodiment, an isocyanate-terminated polyurethane prepolymer can be provided in conventional manner by reaction of suitable isocyanato compounds and one or more suitable polyols, following which the prepolymer is reacted with a compound which functions as a chain extender and which has a hydrophilicity-imparting substituent.

In a second embodiment, suitable isocyanato compounds, suitable polyols, and a suitable hydroxyl-terminated hydrophilicity-imparting agent are reacted together to form a isocyanate-terminated prepolymer which is thereafter reacted with suitable chain extenders.

In a third embodiment, an isocyanate-terminated prepolymer is provided which is chain extended in the presence of an inert ethylenically unsaturated monomeric substance, which substance is thereafter copolymerized with a suitable ethylenically unsaturated hydrophilicity-imparting agent.

Suitable isocyanato compounds useful in providing any of the indicated prepolymers generally constitute saturated or unsaturated, linear, branched, cyclic or polycyclic compounds substituted with two isocyanate groups (i.e., —NCO groups). Compounds with three or more isocyanate groups can also be employed. Preferably, the major amount of isocyanato compounds will contain two isocyanate groups. Examples of satisfactory isocyanato compounds include any described in the publicly available literature as useful in the formation of polyurethanes. Particular examples include aliphatic and aromatic isocyanates such as hexamethylene diisocyanate, trimethylhexamethylene diisocyanate, diphenylmethane-4,4'-diisocyanate, isophorone diisocyanate, methylene bis(isocyanato-cyclohexane), 2-methyl-5-vinylbenzene-1,4-diisocyanate, 1-(alpha-isocyanato-alpha-methyl) ethyl-3(alpha-methyl) ethenylbenzene, as well as polyisocyanates such as Mondur CB (adduct of three moles of toluene diisocyanate with one mole of trimethylolpropane), Desmodur-N (trifunctional biuret of 1,6-hexane diisocyanate), Isonate 143L (polymeric methylene bis(phenyl isocyanate), and the like. Also preferred are toluene diisocyanate, and alpha,omega-alkyl diisocyanates containing 4 to 12 carbon atoms in the alkylene chain, such as 1,6-hexane diisocyanate.

Other useful isocyanato compounds that should be mentioned include tetramethyl xylene diisocyanate, xylene diisocyanate, p-phenylene diisocyanate, p-cyclohexylene diisocyanate, and naphthalene diisocyanate.

The one or more polyols with which the isocyanato component is reacted include any organic compound having two or more pendant hydroxyl groups useful in reacting with the isocyanate groups to form the desired prepolymer and also include cyclic compounds which under reaction conditions open up to provide suitably reactive hydroxyl groups. Preferably the polyols contain an average of at least about two active hydrogen atoms per molecule, the term "active hydrogen atom" referring to hydrogens having activity according to the Zerewitinoff test, *J. Amer. Chem. Soc.* 49, 3181 (1927). Suitable polyol reactants preferably have a molecular weight of about 400 to 5000 and an average hydroxyl value of about 10 to about 300, preferably about 30 to about 150, as determined by ASTM test E222-57, Method B.

Examples of suitable polyols include trimethylol propane, ethylene glycol, propylene glycol, and the like. Suitable cyclic compounds include poly-caprolactones. Preferred diols include alpha,omega-dihydroxy polyesters, particularly esters formed from alkane diols and $C_{2-10}$ dicarboxylic acids such as adipic acid. A particularly preferred polyester diol is that obtained by reacting adipic acid with one or both of 1,4-butane diol and 1,6-hexane diol. Other preferred diols and polyols which should be mentioned include cyclohexane dimethanol, nonanediol, 2,2,4-trimethyl-1,3-pentanediol, 2-butyl-2-ethyl-1, 3-propanediol, 2-methyl-1,3-propylene glycol, neopentyl glycol, alkoxylated Bisphenol A, alkoxylated resorcinol, and other dihydroxy benzenes.

It is preferred that the polyol component reacted with the isocyanato compounds includes at least one reactant effective to help render the polyurethane prepolymer water-dispersible. Such one or more reactants should generally comprise about 0.5 to about 10 wt. % of the reaction mixture. Examples of such reactants include diols or polyols which contain pendant carboxylic acid or cationic salt groups. The pendant carboxylic group can be in salt form or preferably neutralized with a suitable basic material (e.g. a tertiary amine) to salt form during or after the formation of the prepolymer or during the formation of the dispersion. A preferred carboxylic-containing reactant is an alpha,alpha-dimethylol $C_{2-10}$ alkanoic acid, especially 2,2-dimethylol propionic acid. When such a component is incorporated into the reaction forming the prepolymer, there is a subsequent step wherein a neutralizing agent such as triethylamine is added to the mixture containing the prepolymer. Other examples of suitable reactants aiding the water-dispersibility of the polyurethane prepolymer include salts, e.g. sodium sulfonate salts, of active-hydrogen-containing compounds such as diamines.

Other optional additives known in the field of polyurethane synthesis can be included in the reaction to form the isocyanate-terminated polyol, when desired.

As a general matter, the one or more isocyanato compounds and the one or more polyols are reacted together under conditions effective to promote reaction between the isocyanate groups and the hydroxyl groups. There should be a stoichiometric excess of isocyanato compounds over polyol compounds such that upon complete reaction with all the hydroxyl groups there remains an excess of unreacted isocyanate groups.

The agents which are reacted at any of various points during the synthesis of the polyurethane-based polymer systems, so as to impart hydrophilicity to the resulting products, will vary in structure somewhat depending on the nature of the reactive substituent needed to permit the agent to become covalently bound into the polymer system. In general, however, the hydrophilicity-imparting agents are characterized as nonionic compounds containing one or more structures or substituents which, after incorporation into the polymer product, have a high affinity for water. Preferred examples include hydroxyl-substituted compounds, especially hydroxyalkyl compounds such as hydroxyethyl methacrylate, and compounds having one or more chains formed of repeating ethoxy and/or propoxy units capped with hydroxyl or $C_{1-6}$ alkyl such as preferably methyl or ethyl. Other examples will be apparent from the description herein.

Several preferred embodiments of the present invention will be described separately as follows:

Incorporation of the Hydrophilicity-Imparting Agent Into the Prepolymer

In this embodiment one or more isocyanato compounds and one or more polyol compounds suitable for forming a water-dispersible polyurethane prepolymer are combined in a reaction mixture together with one or more hydrophilicity-imparting agents capable of reacting together with the isocyanato compounds and the polyols to form a prepolymer which already incorporates the agent covalently bonded therein. The relative amounts of the reactants should be selected so that following the reaction of all the free hydroxyl groups present in the reaction mixture, there remain unreacted isocyanate groups. In this embodiment the hydrophilicity-imparting agent should have at least one hydroxyl substituent which permits the agent to be reacted into the forming prepolymer. Since any such hydroxyl groups are prone to react with isocyanate groups present in the reaction mixture, the hydrophilicity of the product will need to derive from the presence of structures other than hydroxyl groups having an affinity for water. Preferably then, the agents employed in this embodiment of the present invention are alkyl capped ethers or polyethers. Examples include single ethers such as methyl hydroxyethyl ether, ethyl hydroxyethyl ether, and the like, ethylene oxide adducts thereof having a molecular weight of about 200 to 5000, and also include polyethers such as polyethylene glycols, polypropylene glycols and the like capped at one end with a $C_{1-6}$ lower alkyl group such as methyl. (It is noted that each of these compounds contains at least one hydroxyl group.) Such glycols can have any of a variety of chain lengths ranging preferably from 2 to about 50–60 repeating units, such that the glycol is liquid or solid. It should be soluble in the reaction medium.

The product of the reaction of these three indicated components is then chain extended by any conventional means. That is, the prepolymer formed as indicated is reacted with one or more compounds effective to link isocyanate groups of adjacent prepolymer molecules together. Preferably the chain extension is conducted with organic polyamines, generally aliphatic polyamines which are more reactive with the isocyanate groups than is water. Preferred examples include hydrazine, ethylene diamine, diethylene triamine, organic polyhydrazides, and mixtures thereof.

To provide the product of this embodiment as a dispersion in water, it is preferred that the initial reaction of the isocyanato component, the polyol component and the hydrophilicity-imparting agent be carried out under anhydrous conditions, following which the chain-extension step can be carried out in dispersion in water. As indicated, water dispersibility can be provided by the presence of pendant carboxylic groups or ionized carboxylic groups incorporated covalently into the polyurethane prepolymer. Alternatively, or in addition, water dispersibility can be provided by vigorously agitating the prepolymer in water together with any suitable dispersing agent. Examples abound of suitable dispersing agents; to name but a few, they are characterized as condensation products having in its structure a hydrophobic component containing about 8 to 20 carbon atoms and a plurality of repeating ethylene oxide units (i.e., 2 to 100 moles of ethylene oxide).

Regardless of how the dispersion is formed, it preferably comprises about 40 to about 90 wt. %, and more preferably about 60 to about 80 wt. % of water.

Chain Extending the Prepolymer with the Hydrophilicity-Imparting Agent

In another preferred embodiment of the present invention, an isocyanate-terminated polyurethane prepolymer is provided. This prepolymer can be prepared by any known matter, generally by reacting one or more isocyanato compounds with one or more polyols. The prepolymer can be prepared as described in U.S. Pat. No. 4,644,030, the entire disclosure of which is hereby incorporated herein by reference. The prepolymer can also be prepared in accordance with the preceding section of this application so as to incorporate into the prepolymer an effective amount of a hydrophilicity-imparting agent.

The isocyanate-terminated prepolymer is then reacted with one or more nonionic hydrophilicity-imparting agents such that the one or more agents react with said isocyanate groups so as to chain extend the polyurethane prepolymer.

This reaction may be carried out with a sufficient amount of such nonionic hydrophilicity-imparting agents so as to completely chain extend all unreacted isocyanate groups. However, this reaction may be carried out with less than the stoichiometric amount of such agent, provided that a sufficient amount of such agent is reacted so as to impart hydrophilicity to the final product.

The hydrophilicity-imparting moiety can comprise a main chain substituted with two amino groups, with one or more hydroxyl groups pendant from the main chain. More preferably, however, hydrophilicity is imparted by one or more pendant chains bearing groups or segments having affinity for water. Examples of such groups or chains that are pendant from the diamine include hydroxyl groups, and hydroxyalkyl groups containing 1 to 50 (preferably 1 to 20) carbon atoms. Other examples include hydroxyl-terminated or $C_{1-6}$ terminated poly(ethoxy) or poly(propoxy) chains containing, e.g., 1 to 50 of such repeating alkoxy units. The main chain linking the two functional primary amine groups can be aliphatic, alicyclic or aromatic, and can contain a heteroatom such as oxygen, sulfur or nitrogen. Examples of the main chain from which the hydrophilic moiety is pendant include $C_{2-6}$ alkylene diamine, such as ethylene diamine; and dialkylene triamines, containing 4 to 20 carbon atoms, such as diethylene triamine. Thus, examples of suitable reactive hydrophilicity-imparting agents useful in this embodiment of the present invention include hydroxyethyl-ethylene diamine(3,4-diamino-n-butan-1-ol), as well as higher alkylene-diamines substituted with polyethylene glycol containing up to 50 ethylene oxide units. Other examples of useful chain-extending agents which will impart hydrophilicity to the final product include amine terminated poly(oxyethylene) or amine-terminated or poly (oxypropylene) compounds.

Following the reaction of the isocyanate-terminated polyurethane prepolymer with the agent that chain extends the prepolymer and imparts hydrophilicity to the product, that resulting reaction product is then further chain extended as necessary to fully react any remaining unreacted isocyanate groups in the prepolymer. This chain extending can be carried out in any conventional manner known in the art and is preferably carried out in an aqueous dispersion of the polymer in water. Any suitable chain-extending agent can be employed, such as the chain-extending agents described above, including hydrazine, ethylene diamine, diethylene triamine, and the like.

This reaction step is carried out with compounds that contain two functional groups, each capable of reacting with isocyanate groups, and also contain a moiety (which can be in the main chain of the molecule between the two isocyanate groups, or in a substituent of such chain) which imparts hydrophilicity to the completed product. In general, the functional groups reactive with the isocyanate groups are primary or secondary amine.

Copolymerization of the Hydrophilicity-Imparting Agent Into an Interpolymerized Polyurethane Polymer Product U.S. Pat. No. 4,644,030, the disclosure of which is hereby incorporated herein by reference, discloses aqueous dispersions of polymeric material prepared by providing an isocyanate-terminated polyurethane prepolymer in admixture with inert liquid polymerizable ethylenically unsaturated monomer material, dispersing that product in water, chain extending the prepolymer to fully react it in the aqueous dispersion thus formed, wherein the dispersion can then be subjected to vinyl addition polymerization of the monomer material in situ. It has now been discovered that hydrophilicity can now be imparted to products prepared in the manner described in that patent by adding to the aqueous dispersion prior to the vinyl addition polymerization step, one or more hydrophilicity-imparting agents containing vinyl unsaturation and then copolymerizing the ethylenically unsaturated monomer material with the agent. The resulting interpolymerized network of polyurethane polymer and second polymer will exhibit desirable hydrophilicity.

In this embodiment, the isocyanate-terminated polyurethane prepolymer is prepared in accordance with any known technique and is then dispersed in water again by employment of known means. As indicated above, those means may include incorporation of carboxylic groups in the polymer and/or addition of a suitable dispersing agent at the time that the prepolymer is stirred into water.

The chain extension of the prepolymer is also carried out in accordance with standard techniques using known chain-extending reagents, examples of which are provided hereinabove. The chain extension can be carried using a reactant that also imparts hydrophilicity to the product, as described herein.

Suitable ethylenically unsaturated hydrophilicity-imparting agents useful in this embodiment include any compounds having the desired carbon-carbon double bond and having a chain segment or substituent having an affinity for water. Examples include hydroxy-$C_{1-6}$-alkyl acrylates and methacrylates, such as hydroxyethyl methacrylate, and poly(ethyleneglycol)-vinyl ether containing 2 to 50 repeating ethylene oxide units. Other examples of hydrophilicity-imparting agents which should be mentioned include vinyl sodium sulfonate, alkoxylated allyl alcohol alkoxylated with $C_{1-6}$ alkoxy, and ethoxylated glycerin alkyl ether (which is ethoxylated with 1 to 50 ethoxy units.)

A sufficient amount of the hydrophilicity-imparting agent should be added such that the final polymerized product exhibits the desired hydrophilicity. Generally, amounts of about 5 wt. % to about 40 wt. % of the agent can be employed to effective results.

The two or more ethylenically unsaturated components are then copolymerized together employing any effective needs for initiating and propagating the polymerization. Preferably, the polymerization is carried out using a redox system such as by including on the order of up to one part by weight of potassium persulfate, and then heating the mixture for an effective length of time such as heating to 70° C. on the order of 4 hours. Preferably, an additional redox reagent such as up to about one part by weight of sodium metabisulfite in 40 parts of water is added incrementally to the reaction mixture over the course of the polymerization.

As the polymerization is carried out in an aqueous dispersion, the final interpolymerized product will also be in the form of an aqueous dispersion.

Formulation and Application of Polyurethane Dispersions

A further aspect of the present invention relates to the use of polyurethane polymer dispersions, including but not limited to polyurethane polymer dispersions wherein a nonionic hydrophilicity-imparting agent is incorporated covalently into the polymer network. An improved formulation has been discovered for obtaining improved adherence of films and coatings exhibiting chemical resistance, abrasion resistance, toughness, and flexibility.

Generally speaking, formulations can be prepared which comprise an aqueous dispersion of polyurethane polymer material and additional components to impart additional properties as desired to the film or coating that is thereafter deposited.

The dispersions described herein can be used without further compounding and without the addition of further ingredients to apply films and coatings in many diverse substrates. A thin layer of the dispersion, generally on the order of from 1 to 5 microns up to 20 microns or even up to 50 microns, is applied by any conventional technique to the surface in question, whereupon the water is allowed to evaporate leaving behind the cured film.

Such agents may optionally include additional surfactants, particularly surfactants having an alkyl moiety containing 6 to 20 carbon atoms and a polyalkoxy moiety wherein each alkoxy group is ethoxy or propoxy, there being 2 to 50 of such alkoxy units. There may also be included agents that further provide slip to the final coating, such agents typically including silicone oils such as poly (dimethyl siloxane) or poly(methylphenyl siloxane).

It has been determined that the polyurethane dispersions described hereinabove adhere to the surfaces of substrates to which they are applied.

It has further been determined that the ability of polyurethane dispersions to adhere to substrate surfaces, particularly to the surfaces of natural rubber latex or synthetic elastomeric materials, can be improved by formulating the dispersion with an effective amount of a cross-linking agent and a nonionic hydrophilic polymer, together with a catalyst for the cross linking of the cross linking agent with the polyurethane polymer and the substrate material.

The polyurethane polymer dispersion can be any prepared in accordance with the description herein. The polyurethane polymer dispersion can also be any other polyurethane polymer dispersion, including those described in U.S. Pat. No. 5,088,125 and U.S. Pat. No. 4,644,030, the disclosures of which are hereby incorporated herein by reference, as well as any polyurethane polymer dispersion that can be prepared from the reactants disclosed herein but omitting the hydrophilicity-imparting agent and employing instead any other effective comonomer or chain extending agent as the case may be.

Preferred nonionic hydrophilic polymers include polyethylene glycols, i.e. polymers of repeating ethoxy units, preferably having molecular weights of 50,000 to 125,000. Other preferred nonionic hydrophilic polymers include polyvinyl alcohol, and poly (hydroxy-$C_{1-6}$-alkyl) acrylates and methacrylates, preferably of molecular weight 50,000 to 125,000. The nonionic hydrophilic polymer should comprise about 5 wt. % to about 20 wt. % of the weight of the polyurethane polymer dispersion, preferably about 7 wt. % to about 15 wt. %.

Preferred cross linking agents include melamine, and dispersions in water of epoxides having functionality greater than 1. The cross linking agent reacts with the polyurethane polymer, the nonionic hydrophilic polymer, and the substrate surface to form a cross linked entity covalently bound to the substrate surface.

Typically, the amount of cross linking agent should be about 5 wt. % to about 20 wt. % of the amount of the polyurethane dispersion. Satisfactory catalysts include those of the amine salts of sulfonic acids, such as methane sulfonic acid and toluene sulfonic acid. Satisfactory amounts of the catalyst are generally about 5 wt. % to about 20 wt. % based on the weight of the cross linking agent.

When formulations containing these components and also containing optional components, such as silicone slip agents, nonionic surfactants, and defoaming agents, are applied in a thin film to the substrate, the film cures to an adherent, non-delaminating, protective coating over the substrate which coating resists chemical and physical abrasion and deterioration.

Preferably, the coating formulation is provided in two separate compositions which together form a complete formulation. One composition, in its own separate container, is the polyurethane polymer dispersion. The other composition, in a separate container, comprises all the other components: the nonionic hydrophilic polymer, the cross linking agent, the catalyst for the cross linking, and any other desired components.

In use, the two compositions are intimately blended together, applied to the desired surface, and the cross linking reaction is initiated preferably by application of moderate heat.

The invention will be described further in the following examples, which are included for purposes of illustration and are not intended to be limiting of the scope of the invention.

EXAMPLE 1

This example describes the preparation of a polyurethane dispersion without incorporating a hydrophilicity-imparting agent into the polymer.

Into a resin kettle equipped with a stirrer, thermometer, condenser, and heating mantle, were charged the following ingredients in the percentages indicated:

| INGREDIENT | WEIGHT PERCENT |
| --- | --- |
| Polyester Polyol formed by reaction of Adipic Acid and approx. 1:1 Mixture of 1,4-Butane Diol and 1,6-Hexane Diol | 65.55 |
| Trimethylol Propane | 0.61 |
| Dimethylol Propionic Acid | 4.80 |
| N-Methyl Pyrrolidone | 6.17 |
| Isophorone Diisocyanate | 22.87 |

These products were heated with stirring at 80–100° C. for several hours until the free isocyanate content reached its theoretical limit of 3.38%. At this point the prepolymer which had formed was dispersed in water by combining the components set forth in the following table in the amounts indicated:

| COMPONENT | WEIGHT PERCENT |
| --- | --- |
| Water | 54.66 |
| Silicone Defoaming Agent | 0.09 |
| Triethyl Amine | 1.55 |
| The Prepolymer | 42.29 |
| 35% Aqueous Hydrazine | 1.24 |

The triethyl amine and the defoaming agent were added and mixed into water at 55–75° F. The prepolymer was then added slowly to the water with high shear mixing over a period of 10 to 15 minutes. About 5 minutes after the completion of the prepolymer addition, the aqueous hydrazine was added to react with free terminal isocyanates in the prepolymer and chain extend the polymer. The resulting dispersion had the following properties:

| | |
|---|---|
| Weight Percent Solids | 40 |
| pH | 8.0 |
| Brookfield Viscosity (cps at room temp.) | 200 |

Film cast from this dispersion had the following properties:

| | |
|---|---|
| Tensile Strength, psi | 5,000 |
| Ultimate Percent Elongation | 550 |

EXAMPLE 2
(Chain—extending with an agent containing hydrophilic moiety)

A polyurethane dispersion was made in the manner identical to that described in Example 1 except that 1 wt. % hydroxyethyl-ethylene diamine was used instead of the hydrazine, thereby producing a polymer having pendant hydroxyethyl groups. The dispersion had the following properties:

| | |
|---|---|
| Weight Percent Solids | 30 |
| Brookfield Viscosity (cps at room temp.) | 145 |
| pH | 8.5 |

Film cast from this dispersion had the following properties:

| | |
|---|---|
| Tensile Strength, psi | 5,000 |
| Ultimate Percent Elongation | 550 |

EXAMPLE 3
(Incorporation of the hydrophilicity-imparting agent into the polyurethane prepolymer)

The reactants set forth in the following table were charged into a resin kettle and reacted in the same manner as the first reaction described in Example 1 until the percent of free isocyanate groups reached the theoretical limit:

| COMPONENT | EQUIVALENTS OF REACTANT CHARGED |
|---|---|
| Polyester Polyol as set forth in Example 1 | 0.39 |
| Trimethylol Propane | 0.094 |
| Dimethylol Propionic Acid | 0.645 |
| Isophorone Diisocyanate | 1.864 |
| Methyl-Capped Polyethylene Glycol, m.w. 2000 | 0.021 |

The reactants were charged into a resin kettle and reacted in the same manner as described in Example 1 until the free isocyanate content reached the theoretical limit. The prepolymer was then added to water containing sufficient triethyl amine to neutralize carboxylic acid groups in the prepolymer, followed by chain extension with aqueous hydrazine to produce the final polymeric dispersion. The dispersion had the following properties:

| | |
|---|---|
| Weight Percent Solids | 35 |
| pH | 8.2 |
| Brookfield Viscosity (cps at room temp.) | 490 |
| Particle Size | Semi-Colloidal |

Films cast from the dispersion had the following properties:

| | |
|---|---|
| Tensile Strength, psi | 4,700 |
| Ultimate Percent Elongation | 520 |

EXAMPLE 4
(Incorporation of the hydrophilicity-imparting agent into a polyurethane/polyacrylate interpolymer)

The reactants listed in the following table were combined in the amounts set forth in that table and reacted together in the same equipment and conditions employed in Example 1 until the resulting prepolymer exhibited a free isocyanate content at the theoretical limit of 3.46:

| COMPONENT | PARTS BY WEIGHT |
|---|---|
| Polyester Polyol as set forth in Example 1 | 589.0 |
| Dimethylol Propionic Acid | 44.89 |
| Isophorone Diisocyanate | 204.9 |
| Butyl Acrylate | 130 |

This mixture was heated with mixing at 55–60° C. for 5.5 hours until the isocyanate residue was about 3.4%. Then triethylamine was added in an amount sufficient to neutralize carboxylic groups present in the polymer, and was thoroughly mixed into the mixture. This mixture was then added to water with high agitation to form an aqueous dispersion. Then an amount of hydrazine was added in an amount corresponding to about 90% of the amount theoretically needed to react with all unreacted isocyanate groups. Then 116 g of hydroxyethyl acrylate was added to the dispersion under high shear conditions.

The resulting dispersion was then further polymerized by the addition of 0.9 parts of potassium persulfate and heated to 70° C. for 4 hours. This polymerization can preferably be carried out with a redox system in which about 0.9 parts of potassium persulfate are added, following which a solution of 0.9 parts of sodium metabisulfite in 40 parts of water is added incrementally to the reaction mixture at about 40° C. over a period of 3 hours.

EXAMPLE 5
(Preparation of formulation for coating rubber glove surfaces)

The components set forth in the following table were mixed together in the amounts indicated in that table:

| COMPONENT | PARTS BY WEIGHT |
|---|---|
| Water | 4670.2 |
| Polyurethane Dispersion Prepared in Accordance with Example 1 | 742.3 |
| Surfactant (p-Nonyl Phenol Ethoxylate Containing About 50 Ethoxy Units) | 25.0 |
| 10% Aqueous Solution of Polyethylene Glycol Having a Degree of Polymerization of 80,000–100,000 | 749.3 |
| Melamine | 95.9 |

-continued

| COMPONENT | PARTS BY WEIGHT |
|---|---|
| Dimethicone Lubricant | 79.9 |
| Defoaming Agent | 0.7 |
| Amine Salt of Sulfinic Acid (Catalyst for Melamine Cross Linking) | 14.9 |

This mixture was stirred for about 30 minutes using a high-speed impeller at a temperature of about 25° C. The resulting dispersion had a solids content of about 5 wt. %.

Prevulcanized latex rubber gloves were dipped into the above dispersion for 12 seconds and then dried at a minimum temperature of 120° C. for 30 to 40 minutes. In a donnability rating test in which 10 signifies the best degree of donnability and 1 signifies the poorest, gloves treated in this manner exhibited a dry donnability rating of 8, damp donnability rating of 7–8, whereas gloves used as controls exhibited donnability of 7–8. Coatings applied in accordance with this invention withstand severe treatment without undergoing delaminating.

EXAMPLE 6

(Formulating the polyurethane dispersion of Example 2 for application to rubber glove surfaces)

The components set forth in the following table were combined together in the amounts set forth in the table:

| COMPONENT | AMOUNT (grams) |
|---|---|
| Polyurethane Dispersion Prepared in Accordance with Example 2 | 559.5 |
| Surfactant (p-Nonyl Phenol Ethoxylate Containing About 50 Ethoxy Units) | 14.2 |
| 10% Aqueous Solution of Polyethylene Glycol Having a Molecular Weight of 80,000–100,000 | 423.4 |
| Melamine | 54.2 |
| Dimethicone Lubricant | 45.1 |
| Defoaming Agent | 0.4 |
| Sulfinic Acid Amine Salt (Catalyst for Melamine Cross Linking) | 8.4 |
| Water | 4519.5 |

This mixture was allowed to mix for about 30 minutes using a high-speed impeller at a temperature of about 25° C. The resulting dispersion had a solids content of about 5 wt. %. A pre-vulcanized rubber glove was dipped into the above dispersion for 12 seconds and then dried in a convection oven at 120° C. for 40 minutes.

The resulting product had a coating about 0.35 ml in thickness, which exhibited excellent adhesion and a dry donnability rating of 8 and a damp donnability rating of 7.

EXAMPLE 7

Gloves made from natural rubber latex via conventional coagulation techniques were coated with polyurethane dispersions prepared in accordance with the teachings herein or with polyurethane dispersion which had been further formulated with the melamine cross-linking system described hereinabove, followed by vulcanization at 130° C. for 30 to 40 minutes. The gloves were then tested for donnability by measuring the coefficient of friction of the glove surface that had been coated. The tear strength (in pounds per linear inch, or "pli") and 500% modulus strength (in pounds per square inch, or "psi") were also measured. The table below summarizes the findings:

| TYPE OF GLOVE | COEFF. OF FRICTION | 500% MOD. (psi) | % ELONG. | TEAR STRENGTH (pli) |
|---|---|---|---|---|
| Uncoated Rubber Gloves (control) | 1.55 | 586 | 850 | 323 |
| Rubber Gloves Coated with Polyurethane Dispersion Prepared in Accordance with Example 2 | 1.25 | — | — | — |
| Rubber Gloves Coated with Polyurethane Dispersion Prepared in Accordance with Example 2 and Further Compounded with Melamine Cross-Linking System | 0.54 | 567 | 843 | 370 |
| Rubber Gloves Coated With Polyurethane Dispersion Prepared in Accordance with Example 1 and Further Compounded with Melamine Cross-Linking System | 0.30 | 584 | 887 | 380 |

What is claimed is:

1. An aqueous coating composition consisting essentially of:
   (a) an aqueous dispersion of a polyurethane polymer wherein the dispersion comprises about 40 to about 90 wt. % water;
   (b) from about 5 to about 20% by weight, based on the dispersion (a), of a nonionic hydrophilic polymer selected from the group consisting of polyethylene glycol, polyvinyl alcohol and poly(hydroxy $C_{1-6}$ alkyl) acrylates and methacrylates having a molecular weight of about 50,000 to about 125,000;
   (c) from about 5 to about 20% by weight, based on the dispersion (a), of a cross-linking agent; and
   (d) from about 5 to about 20% by weight, based on the cross-linking agent (c), of a catalyst for the cross-linking agent,
   wherein the composition produces a water-resistant and organic solvent-resistant hydrophilic film or coating on a substrate when applied thereon.

2. The composition according to claim 1, wherein the viscosity of the aqueous dispersion (a) is up to 490 cps at room temperature.

3. The composition according to claim 2, wherein the viscosity is 200 cps at room temperature.

4. The composition according to claim 2, wherein the viscosity is 145 cps at room temperature.

5. The composition according to claim 1, wherein the aqueous dispersion (a) is comprised of about 60 to about 80 wt. % water.

6. The composition according to claim 1, wherein the nonionic hydrophilic polymer (b) is in an amount of about 7 to about 15 wt. %.

7. The composition according to claim 1, wherein (a), (b), (c) and (d) form component I, and the composition further includes water as component II, wherein the weight ratio II:I is about 5 to about 7.

8. The composition according to claim 7, wherein the weight ratio II:I is 5.

9. The composition according to claim 7, wherein the weight ratio II:I is 6.8.

10. The composition according to claim 1, further including one or more additives selected from the group consisting of a surfactant, a slip agent, and a defoaming agent.

11. The composition according to claim 7, wherein
   (a) the viscosity of the aqueous dispersion is 200 cps at room temperature;
   (b) the nonionic hydrophilic polymer is present in an amount of about 10 wt. %, based on the dispersion (a);
   (c) the cross-linking agent is melamine present in an amount of about 13 wt. %, based on the dispersion (a);
   (d) the catalyst is an amine salt of sulfinic acid present in an amount of about 15.5 wt. %, based on the cross-linking agent (c); and
   the weight ratio of II:I is about 5.

12. The composition according to claim 11, wherein the nonionic hydrophilic polymer (b) is in aqueous solution.

13. The composition according to claim 11, further including a surfactant, a defoaming agent and a slip agent.

14. The composition according to claim 7, wherein
   (a) the viscosity of the aqueous dispersion is 145 cps at room temperature;
   (b) the nonionic hydrophilic polymer is present in an amount of about 7.5 wt. %, based on the dispersion (a);
   (c) the cross-linking agent is melamine present in an amount of about 7.5 wt. %, based on the dispersion (a);
   (d) the catalyst is an amine salt of sulfinic acid present in an amount of about 15.5 wt. %, based on the cross-linking agent; and
   the weight ratio of II:I is about 7.

15. The composition according to claim 14, further including a surfactant, a defoaming agent and a slip agent.

16. The aqueous coating composition according to claim 1, wherein the cross-linking agent is selected from the group consisting of melamine and epoxides having functionality greater than 1.

17. A two-part coating composition consisting essentially of:
   (a) in a first container, an aqueous dispersion of a polyurethane polymer, the polyurethane polymer comprising from about 20 to about 90% by weight water; and
   (b) in a second container, a mixture comprising a nonionic hydrophilic polymer selected from the group consisting of polyethylene glycol, polyvinyl alcohol and poly(hydroxy $C_{1-6}$ alkyl) acrylates and methacrylates having a molecular weight from about 50,000 to about 125,000, a cross-linking agent, and a catalyst for the cross-linking agent,
   wherein the nonionic hydrophilic polymer and cross-linking agent are each present in the amount of from about 5 to about 20% by weight, based on the dispersion, and the catalyst is present in the amount of from about 5 to about 20% by weight, based on the cross-linking agent, and
   the composition produces a water-resistant and organic solvent-resistant hydrophilic film or coating on a substrate when applied thereon.

18. A substrate having a water-resistant and organic solvent-resistant hydrophilic coating thereon, the coating being derived from a coating composition consisting essentially of:
   (a) an aqueous dispersion of a polyurethane;
   (b) from about 5 to about 20% by weight, based on the dispersion (a), of a nonionic hydrophilic polymer selected from the group consisting of polyethylene glycol, polyvinyl alcohol and poly(hydroxy $C_{1-6}$ alkyl) acrylates and methacrylates having a molecular from about 50,000 to 125,000;
   (c) from about 5 to about 20% by weight, based on the dispersion (a), of a cross-linking agent; and
   (d) from about 5 to about 20% by weight, based on the cross-linking agent (c), of a catalyst for the cross-linking agent.

19. A rubber glove having a water-resistant and organic solvent-resistant hydrophilic coating thereon, the coating being derived from a coating composition comprising:
   (a) an aqueous dispersion of a polyurethane;
   (b) from about 5 to about 20% by weight, based on the dispersion (a), of a nonionic hydrophilic polymer selected from the group consisting of polyethylene glycol, polyvinyl alcohol and poly(hydroxy $C_{1-6}$ alkyl) acrylates and methacrylates having a molecular from about 50,000 to 125,000;
   (c) from about 5 to about 20% by weight, based on the dispersion (a), of a cross-linking agent; and
   (d) from about 5 to about 20% by weight, based on the cross-linking agent (c), of a catalyst for the cross-linking agent.

20. The coated substrate according to claim 18, wherein the coating exists in the form of a film barrier having a thickness of from about 1 to 50 microns.

* * * * *